United States Patent [19]

Kojima

[11] Patent Number: 4,904,427
[45] Date of Patent: Feb. 27, 1990

[54] PROCESS OF PREPARING INORGANIC LIGHT WEIGHT FOAM

[75] Inventor: Hirosuke Kojima, Tokyo, Japan

[73] Assignee: Nissho Giken Corporation, Ltd., Tokyo, Japan

[21] Appl. No.: 234,757

[22] Filed: Aug. 22, 1988

[30] Foreign Application Priority Data

Feb. 24, 1988 [JP] Japan .................................. 63-41520

[51] Int. Cl.$^4$ ...................... B29C 39/02; B29C 43/02; B29C 67/20
[52] U.S. Cl. ........................................................ 264/42
[58] Field of Search .......................................... 264/42

[56] References Cited

FOREIGN PATENT DOCUMENTS 2123426A 2/1984 United Kingdom .

Primary Examiner—Jan H. Silbaugh
Assistant Examiner—Karen D. Kutach
Attorney, Agent, or Firm—Bacon & Thomas

[57] ABSTRACT

A foamable composition for preparing inorganic light weight foam includes an inorganic powder and vinyl chloride-based resin as main components, and an organic solvent and a foaming agent. The vinyl chloride-based resin is a higher molecular weight resin made by suspension-polymerization or mass-polymerization, and has an average degree of polymerization ($\bar{p}$) of 1300 to 10000 as defined by JIS K-6721-1959. The ratio by weight of the inorganic powder to the vinyl chloride-based resin ranges from 50:50 to 85:15. The organic solvent has a solubility parameter ($\delta$) of 7 to 10, and a boiling point of 80° C. to 140° C. The ratio by weight of the organic solvent to the total amount of the inorganic powder and the vinyl chloride-based resin ranges from 60:40 to 40:60. The inorganic powder and vinyl chloride-based resin components are kneaded at between 140 and 200 degrees Celsius, while applying a shearing force on the kneaded composition. The organic solvent and foaming agent are mixed with the kneaded composition at 40 to 80 degrees Celius, thereby forming a foamable composition which is molded and foamed under pressure at between 150 and 180 degrees Celsius.

2 Claims, No Drawings

PROCESS OF PREPARING INORGANIC LIGHT WEIGHT FOAM

BACKGROUND OF THE INVENTION

1. Field of the Invention

The present invention relates to a composition for preparing inorganic light weight foam, and a process of preparing inorganic light weight foam.

2. Description of the Related Art

Processes of manufacturing a rigid and light weight foam made by adding a foaming agent to a composition whose main components are a vinyl chloride-based resin and inorganic powder are disclosed in, e.g., Japanese Patent Publication No. 53-7944 and Japanese Patent Publication No. 52-26776. It is specified in these publications that the foaming agent used in these processes is liquid butane, and that the vinyl chloride-based resin used is a paste resin.

Besides these processes wherein an organic or inorganic foaming agent is used, other processes are known. In the process which is disclosed in Japanese Patent Disclosure No. 56-129236, a nitrile compound is added. In the process disclosed in Japanese Patent Disclosure No. 59-8660, an azo-based or sulfur-based free radical initiator is added. In the process disclosed in Japanese Patent Disclosure No. 61-151073, an organic peroxide is added.

According to the publications which disclose the processes wherein an azo-based or sulfur-based, free-radical initiator and an organic peroxide free radical initiator are added, radicals are generated by virtue of the heat generated when the inorganic powder and the vinyl chloride-based resin are kneaded together. These radicals induce no cross-linking of the vinyl chloride-based resin. Rather, the radicals induce the hydrogen abstraction of both the inorganic powder and the vinyl chloride-based resin, and also couple the fragments of the free radical initiator, thereby increasing the compatibility of both compounds (or activating both compounds) and promoting the homogeneous dispersion of these compounds.

In the known processes described above, a foaming agent and other additives are added to a composition whose main components are vinyl chloride-based resin and inorganic powder, thereby preparing a foamed body of a high expansion ratio. However, each is a process wherein all materials are merely mixed and dispersed, and the resultant mixture is foamed by means of a foam molding machine such as a press machine. This process does not use the step of "livering" (The term "livering" means a phenomenon wherein the resin comes into a molten state, as will be later described.) at an appropriate temperature under shearing force, until the step of charging the mixture into a mold of the foam molding machine. From a technical point of view, in the known processes, the vinyl chloride-based resin must be used in the form of a paste resin which resin is of very fine particle size such as less than several microns, as is specified in any patent publication or disclosure identified above.

As far as the present inventor knows, there is only one prior art publication, i.e., Japanese Patent Disclosure No. 63-85071, which teaches that conditions for shearing action and displacement action are technical points of vital importance.

In the process disclosed in Japanese Patent Disclosure No. 63-85071 a foaming agent and an organic peroxide or an azo compound having a specific activation energy is added to a composition whose main components are an inorganic filler and vinyl chloride-based resin prepared by suspension polymerization, mass polymerization, or emulsion polymerization, thereby to cross-link and foam the composition. The addition of the foaming agent and the organic peroxide or azo compound to the composition is carried out while the composition is undergoing particle dispersion and melt dispersion in a kneader which can perform shearing and displacement. It is true that this process has the same object as the present invention, that is, the prevention of leakage of foaming gas. Nonetheless, this is a process for preventing a leakage of foaming gas by means of the cross-linking of the composition, and the important actual means employed in this process are basically different from those used in the process according to the present invention.

SUMMARY OF THE INVENTION

It is accordingly the object of the present invention to provide a process by which a rigid, light weight foam can be easily manufactured at low cost by using a vinyl chloride-based resin prepared by suspension polymerization or mass polymerization.

According to the present invention, there is provided a composition for preparing inorganic light weight foam, said composition comprising inorganic powder as a majority and vinyl chloride-based resin as a minority as its main components along with an organic solvent and a foaming agent. The composition is characterized in that said vinyl chloride-based resin is a polymer resin prepared by means of suspension polymerization or mass polymerization and has an average degree of polymerization (usually expressed by $\bar{p}$ in Japan) ranging from 1300 to 10000, the composition ratio, by weight, between the inorganic powder and the vinyl chloride-based resin ranges from 50:50 to 85:15, the organic solvent has a solubility parameter ($\delta$) ranging from 7 to 10 and a boiling point ranging from 80° C. to 140° C., and the composition ratio, by weight, between the organic solvent and the total amount of the inorganic powder and the vinyl resin ranges from 60:40 to 40:60.

Also, according to the present invention, there is provided a process of preparing a rigid and light weight foam, which comprises the steps of: kneading a composition, whose main components are a vinyl chloride-based resin and inorganic powder, at 140° C. to 200° C. while applying a shearing force on the composition; adding an organic solvent and a foaming agent to the kneaded composition, and mixing the composition, the organic solvent, and the foaming agent, at 40° C. to 80° C., thereby forming a foamable composition in which the organic solvent thoroughly penetrates into the main components; and foaming the foamable composition under pressure at 150° C. to 180° C.

According to the present invention, there is also provided an inorganic light weight foam prepared by the above process as well as a heat insulator for liquefied natural gas tanks which is made of the foam.

DETAILED DESCRIPTION OF THE PREFERRED EMBODIMENTS

The vinyl chloride-based resin (hereinafter referred to as PVC) is a polymer resin prepared by means of suspension polymerization or mass polymerization and having an average degree of polymerization $\bar{p}$ ranging from 1300 to 10000. The average degree of polymerization $\bar{p}$ is measured by the test method defined in Japanese Industrial Standards, JIS-K-6721-1959, Test methods for polyvinyl chloride resin.

Hitherto, such a higher $\bar{p}$ (high molecular weight) PVC has been used for manufacturing plasticized product containing a great amount of a plasticizer, but has never been used for preparing non-plasticized, rigid foams as in the present invention. This is because the "livering" of the composition of rigid or nonplasticized formulation, with a higher $\bar{p}$ PVC, has never succeeded for manufacturing the rigid mold through kneading, and the resulting articles made from such a composition is thus brittle and mechanically weak.

According to the present invention, use is made of a higher $\bar{p}$ PVC which has an increased filler loadability, that is, which can contain a great amount of inorganic powder in order to be used in preparing an incombustible insulator. In addition, the organic solvent specified above penetrates into the PVC particles at the specific temperature described above. Thus, a composition comprising the PVC and a great amount of inorganic powder is provided, from which rigid foamed bodies can be prepared.

The process of preparing a rigid foam, according to the present invention, comprises three steps. In the first step, a large amount of inorganic powder and a higher $\bar{p}$ PVC are mixed and kneaded together, thereby forming a composition in which the inorganic particles are coated with the PVC. More specifically, while the inorganic powder and the PVC are being kneaded, a shearing force is applied to the PVC particles having an initial diameter of about 100 $\mu$ at a predetermined temperature, thus crushing them into secondary PVC particles having a diameter of about 1 to 2 $\mu$ ("livering"). These secondary PVC particles cover the surface of every inorganic particle. Preferably, the shearing force is $10^2$ to $10^6$ dynes, by which primary PVC particles are compressed at a compression ratio of 2.0 or more at the kneading site. It is desirable that the inorganic powder and the PVC be kneaded at 140° C. to 200° C. Both the shearing force and the kneading temperature must be selected in accordance with the average degree of polymerization ($\bar{p}$) the PVC used in forming the composition. The inorganic powder and the PVC must be kneaded until the skins of the PVC primary particles are crushed into secondary particles, which cover up the inorganic particles. Hence, the inorganic particles are thoroughly coated with the higher $\bar{p}$ PVC.

In the second step of the process according to the present invention, the kneaded composition, a foaming agent, and an organic solvent are mixed, thereby forming a foamable composition. More precisely, the organic solvent is mixed with the composition and the foaming agent at 40° C. to 80° C. This operation can lead the prevention of gas leakage from the composition during the subsequent foaming step (that is, in order to keep the foaming gas inside the foamed cell structure so that the resultant foamed body can retain a desired shape for a long time). The composition, the foaming agent, and the organic solvent are either stir-mixed or stirkneaded. During the mixing step, the composition kneaded in the first step must contact the organic solvent at 40° C. to 80° C. Since the composition and the solvent are heated to such a temperature while these two components and the foaming agent are being mixed, the organic solvent penetrates into the secondary PVC particles (usually about 1 to 2 $\mu$ in diameter).

As a result, the secondary PVC particles fuse together tightly, forming a coating dense enough to prevent leakage of blowing gas, thereby contributing to manufacture of a rigid foamed body. To heat the composition and the solvent, it suffices either to heat the solvent and add it to the composition, or to add the solvent to the composition at room temperature and then heat the resultant mixture.

Since the organic solvent penetrates into the composition, the secondary-fine PVC particles can fuse together with high efficiency during the foaming process, i.e., the final step of the process according to the invention.

In the third step of the process according to this invention, the foamable composition prepared in the second step is molded and foamed under pressure at 150° C. to 180° C. Since the PVC contained in the foamable composition has higher $\bar{p}$, a cell structure with a better elongation is formed while the PVC being foamed within a metal press-mold at 150° to 180° C. Therefore, the composition can be made into a foamed body having a high expansion ratio.

When the existing plastic foamed products are used as various types of insulators, their shrinkage becomes a problem occasionally. The foamed products made from the composition according to the invention or made by the process according to the invention undergo no shrinkage since the PVC has higher $\bar{p}$ and the PVC particles fuse tightly.

The results of the experiments conducted by the present inventor show that the mechanical strength of a rigid foamed body, such as tensile strength and compression strength, is proportional to the average degree of polymerization $\bar{p}$ of the PVC.

The foamed body according to the present invention can be used as a heat insulator for LNG (Liquefied Natural Gas) tanks. At present, perlite (an inorganic substance) is mainly used to insulate LNG tanks set up on the ground, and urethane foam is chiefly used to insulate LNG tanks installed under the ground. The results of the experiments which the present inventor has carried out show that the urethane foam, now used for insulating the underground LNG tanks, cracks in an extremely short period of time. In contrast, the foam prepared according to the present invention can remain intact for a very long time, as is proved by the test with liquefied nitrogen gas and also as is evident from the safety index of an LNG tank insulator, given below:

Safety index $= \epsilon/\alpha$, where $\alpha$ is the linear thermal expansion coefficient of the foam, and $\epsilon$ is the elongation of the foam. Coefficient $\alpha$ is 60 to 80 g $10^{-6}$ for the urethane foam, and 20 to 25 $\times 10^{-6}$ for the foam according to the present invention. At an extremely low temperature of $-160°$ C., urethane foam exhibits elongation of almost 0, whereas the foam according to this invention exhibits still sufficient elongation. This is because PVC is a high-molecular-weight substance whose side chains vibrate even at an extremely low temperature of $-150°$ C. to $-160°$ C.

(Choice of Organic Solvent, and Changes in Conditions)

Solubility parameter $\delta$ is considered one of the determinants of the compatibility of an organic solvent with PVC. PVC has solubility parameter $\delta$ of 9.38 to 10.8. Hence, the closer $\delta$ of the solvent to that of PVC, the better. Practically, it is desired that δ=7 to 10. Here, the lipophilic nature of the organic solvent comes into play. If δ is 7 or less, it is too much lower than solubility parameter of PVC and not so compatible. If δ is 11 or more, the solvent is then hydrophilic and again not so compatible with PVC. On the other hand, toluene, xylene, ethylbenzene, and the like—all being aromatic hydrocarbons—have a solubility parameter of 8 or 9. Hence, they are lipophilic and more compatible with PVC. Alcohols are hydrophilic, though they have solubility parameters of 11 or 12; they are thus not sufficiently compatible with PVC.

Another determinant of selection of an organic solvent is the boiling point. It is desirable that the organic solvent boil at 80° C. to 140° C. One of the reasons is that the surfaces of the PVC particles are activated at 40° C. to 80° C., and the viscosity of the solvent decreases at 40° C. to 80° C. For example, the viscosity of toluene is 0.58 cp (centipoises) at 20° C., 0.40 cp at 50°, 0.37 cp at 60° C., and 0.34 cp at 70° C. Obviously, the higher the temperature, the lower the viscosity of toluene.

The vapor pressure of the organic solvent, e.g., toluene, is 21 mmHg at 20° C.; it increases 6.6 times, to 139 mmHg, at 60° C.

Both the decrease in the viscosity of the organic solvent and the rise of the vapor pressure thereof greatly promote the penetration of the solvent into micropores of the PVC particles.

The foaming agent, which is decomposable, can be decomposed at about 100° C. to 150° C. when it is used together with an auxiliary foaming agent. Hence, the organic solvent and the foaming agent must be added to the main components of the composition, and then be mixed and kneaded together with these main components at a temperature of 80° C. or less. A preferred organic solvent is, therefore, one whose boiling point is at least 80° C.

Any organic solvent, whose boiling point is 140° C. or more, can hardly be removed from a foamed product, and must be heated to an excessively high temperature. In view of these, the use of such an organic solvent is undesirable.

(Materials Used in the Invention)

(1) Inorganic Powder

Any inorganic powder can be used in the this invention. Nonetheless, inorganic powder having a mean particle size of about 70 μ is preferred. Specifically, carbonates, sulfates, silicates, phosphates, borates, oxides, hydroxides of metals such as calcium, magnesium, aluminum, titanium, iron and zinc can be used. Further, hydrates of these inorganic substances, and also silica, bentonite, clay, and the like can be used. According to the present invention, one or more of these inorganic substances are used in the form of a powder.

Since the inorganic powder is used in this invention for the purpose of providing an inorganic, rigid foam, the composition ratio, by weight, between it and the vinyl chloride-based resin ranges from 50:50 to 85:15.

(2) Vinyl Chloride-based Resin (PVC)

The vinyl chloride-based resin used in the present invention is either a homopolymer of vinyl chloride, or a copolymer of vinyl chloride and a monomer polymerizable with vinyl chloride. (The composition ratio of vinyl chloride in this copolymer is 50g or more.) Any vinyl chloride resin or copolymer may be used, which is made by suspension polymerization, mass polymerization, or emulsion polymerization. However, the present invention makes use of PVC made by suspension polymerization or mass polymerization because a higher $\bar{p}$ product is readily available at a reasonable price on the market.

A monomer, which is polymerizable with vinyl chloride, may be used, selected from the group consisting of vinylidene chloride, vinyl acetate, maleic acid, acrylic acid, acrlate ester, methacrylic acid, methacrylate ester, acrylonitrile, methacrylonitrile, styrene, ethylene, propylene, and the like.

Nonetheless, it is most desirable that a homopolymer of vinyl chloride be used, since this polymer is inexpensive, heat resistant, and sufficiently incombustible. Preferably, a polymer having an average degree of polymerization $\bar{p}$ ranging from 1300 to 10000 is used in this invention, as has been pointed out. The higher degree of polymerization $\bar{p}$ of the PVC, the better.

A commonly used additive or additives, such as PVC stabilizers commonly used, may be added to the vinyl chloride resin.

(3) Organic Solvent

As has been discussed above, another important point is selection of an organic solvent.

According to the present invention, use is made of an organic solvent whose solubility parameter δ, which determines the compatibility with PVC, ranges from 7 to 10, and whose boiling point ranges from 80° C. to 140° C. Organic solvents, which have solubility parameter and boiling point falling within these ranges are: heptane, isoheptane, isooctane, cyclohexane, benzene, toluene, xylene, ethylbenzene—all being hydrocarbons; ethyl acetate and butyl acetate—these being acid esters. Of these organic solvents, toluene is most preferred. Ether-type or ketone-type organic solvents which contain oxygen atoms, such as acetone, methyl ethyl ketone, tetrahydrofuran, and the like are indeed sufficiently compatible with PVC. However, they are liable to undergo decomposition-explosion while the composition is being foamed under pressure. Therefore, it is better that they not be employed.

According to the present invention, the organic solvent is used in a weight ratio to the total amount of the inorganic powder and PVC, ranging from 40:60 to 60:40. When less than 40 parts by weight of the organic solvent is used, the amount is insufficient, and the solvent fails to penetrate into fine PVC particles whose total surface area is greater than that which the PVC particles have before they are broken into these fine particles. On the other hand, when more than 60 parts by weight of the organic solvent is used, excessive solvent will remain in the foamable composition in the isolated form, resulting in a rise of the partial pressure in the metal press mold during the foaming process. The raised partial pressure of the excessive solvent will hinder the fusing of the PVC particles, inevitably creating a possibility of gas leakage.

(4) Decomposable type of Foaming Agent

Any commonly used, organic or inorganic foaming agent, which is decomposed when heated, can be used in the present invention.

The organic foaming agents, which can be used in this invention, are: azodicarbonamide, N, N'-dinitrosopentamethylene tetramine, N, N'-dinitroso-N-N'-dimethyl terephthal amide, benzene sulfonyl hydrazide, p-toluene sulfonyl hydrazide, 4,4'-oxybis benzene sulfonyl hydrazide, benzene-1, 3-disulfohydrazide, terephthalic azide, and the like.

The inorganic foaming agents, which can be used in the present invention, are sodium bicarbonate, ammonium chloride, and the like.

Two or more of these foaming agents, either organic or inorganic, are used in many cases. Further, in many cases they are used in combination with an auxiliary foaming agent such as those of a urea-type.

(Kneader Capable of Applying Shearing Force)

The kneaders, listed below, can be used in this invention. These kneaders do not need to have special specifications, but must be able to apply a shearing force on the mixture of the materials.

(1) Roll, Calendar Types

This is a typical example of batch-processing kneaders.

(2) Intensive Mixer Type

This kneader has two rotors. The rotors are rotated in the opposite directions at slightly different speeds, thus applying shearing force on the mixture.

(3) Screw Extruder

This kneader has either single screw which applies shearing force on the mixture as it rotates, or two screws which are in mesh or not in mesh with each other and are rotated in either the same direction or the opposite directions.

(4) Multi-Screw Kneader

This is a kneader provided with three or more screws.

(5) Kneader Having Disks

This kneader has one stationary disk and one rotating disk, which cooperate to apply shearing force on the mixture. Example: KCK kneader manufactured by KCK Industrial Co. Ltd., Japan.

(6) Kneader Having a Reciprocal Screw

A typical example of this is a co-kneader.

One of these kneaders (1) to (6), or a combination of two or more of these machines are used to knead the mixture, thereby "livering" the vinyl chloride-based resin into small particles, and covering the particles of the inorganic powder with the resin particles, at a suitable kneading temperature for the molecular weight of the vinyl chloride-based resin used.

Several examples of the present invention, and a few controllers will now be described.

EXAMPLE 1

One hundred grams (100 g) of suspensionpolymerization PVC ($\bar{p}=3000$), 120 g of calcium carbonate, 100 g of magnesium silicate, 90 g of talc, 40 g of titanium oxide, 9 g of tribasic lead sulfate, 5 g of dibasic lead stearate, and 2 g of lead stearate—the last three components being used as a heat stabilizer of the PVC—were mixed and stirred in a Henschel mixer for 5 minutes. The resultant mixture was kneaded at 185° C. by means of a KCK continuous kneader which has a stationary disk and a rotating disk.

Twenty grams (20 g) of dinitrosopentamethylenetetramine used as the foaming agent, 20 g of urea-type auxiliary foaming agent, 13 g of azobisisobutyronitrile, and 400 g of toluene were added to the kneaded mixture. The resultant mixture was stirred by a ribbon blender for 15 minutes. The stirred mixture was extruded at 65° C. at the compression ratio of 0; there was no flow resistance at the end of the single-axle extruder, driven at low speed.

The resulting dry, extruded mixture was charged into a press mold (cavity size: 20 cm × 10 cm × 3.5 cm). The mixture was first heated at at 100° C. for 10 minutes, then at 120° C. for 10 minutes, and finally at 160° C. for 15 minutes, under pressure. Then, the press mold was cooled quickly, thereby forming a foamed body.

The foamed body was placed in an oven, and heated at 110° for three days, thereby forming a rigid foamed body which measured 39 cm × 19 cm × 7 cm. Hence, the expansion ratio was 7.4. The rigid foamed body exhibited a density of 100 kg/m3, a tensile strength of 8.5 kg/cm$^2$, and a compression strength (yield value) of 3.5 kg/cm$^2$.

EXAMPLE 2

One hundred grams (100 g) of suspension-polymerization PVC ($\bar{p}=2500$), 160 g of calcium carbonate, 160 g of talc, 9 g of tribasic lead sulfate, 5 g of dibasic lead phosphite, and 1 g of lead stearate were mixed and stirred in a blender for 15 minutes. The resultant mixture was kneaded at 180° C. by means of a screw extruder having two screws meshing with each other and rotating in the same direction.

Eighteen grams (18 g) of azodicarbonamide used as the foaming agent, 18 g of urea-type auxiliary foaming agent, 10 g of azobisisobutyronitrile, and 380 g of toluene were added to the kneaded mixture. The resultant mixture was extruded at 70° C. at the compression ratio of 0; there was no flow resistance at the end of the single-axle extruder, driven at low speed.

The extruded mixture was charged into a press mold having the same size as that used in the above Example 1. The mixture was heated under pressure first at 100° C. for 10 minutes, then at 120° C. for 10 minutes, and finally at 160° C. for 15 minutes. The press mold was cooled quickly, thereby forming a foamed body.

The foamed body was placed in an oven, and heated at 110° for three days, thereby forming a rigid foamed body. The expansion ratio was 7.3. The rigid foamed body exhibited a density of 100 kg/m$^3$, a tensile strength of 7.4 kg/cm2, and a compression strength (yield Value) of 2.9 kg/cm$^2$.

EXAMPLE 3

A blend of 76 g of suspension-polymerization PVC ($\bar{p}=1950$) and 24 g of suspension-polymerization PVC ($\bar{p}=1300$), with $\bar{p}$ of this blend being considered to be 1800 in arithmetic mean, were mixed by means of a blender with 160 g of calcium carbonate, 140 g of magnesium silicate, 50 g of talc, 8 g of tribasic lead sulfate, 4 g of dibasic lead stearate, and 1 g of lead stearate, and the resultant mixture was kneaded at 180° C. by means of a screw extruder having two screws not meshing with each other.

Fifteen grams (15 g) of azodicarbonamide, 15 g of urea-type auxiliary foaming agent, 15 g of azobisisobutyronitrile, and 360 g of toluene were added to the kneaded mixture. The resultant mixture was extruded at 65° C. at the compression ratio of 0; there was no flow resistance at the end of the single-axle extruder driven at low speed.

The extruded mixture was charged into a press mold having the same size as that used in Example 1. The mixture was heated under pressure first at 120° C. for 15 minutes, and then at 160° C. for 15 minutes. The mold was cooled quickly, thereby forming a foamed body.

The foamed body was placed in an oven, and heated at 110° for three days, thereby forming rigid a foamed body. The expansion ratio was 7.15. The rigid foamed body exhibited a density of 100 kg/m$^3$, a tensile strength of 5.8 kg/cm², and a compression strength (yield value) of 2.1 kg/cm².

EXAMPLE 4

One hundred grams (100 g) of mass-polymerization PVC ($\bar{p}=1300$), 120 g of calcium carbonate, 110 g of magnesium silicate, 5 g of tribasic lead sulfate, 3 g of dibasic lead phosphite, and 2 g of lead stearate were mixed. The resultant mixture was extruded at 170 C by means of a screw extruder having two screws not meshing with each other.

Fourteen grams (14 g) of dinitrosopentamethylenetetramine, 14 g of urea-type auxiliary foaming agent, 10 g of azodicarbonamide, and 300 g of toluene were added to the kneaded mixture. The mixture was stirred and mixed. The resultant mixture was extruded at 60° C. at the compression ratio of 0; there was no flow resistance at the end of the extruder. The extruded mixture was heated in a press mold first at 120° C. for 10 minutes, and then at 160° C. for 15 minutes thereby forming a foamed body.

The foamed body was cooled quickly, and then placed in an oven, and heated at 110° for three days, thereby forming a rigid foamed body. The expansion ratio was 7.0. The rigid foamed body exhibited a density of 100 kg/m³, a tensile strength of 4.1 kg/cm², a and compression strength (yield value) of 1.1 kg/cm².

COMPARATIVE EXAMPLE 1

One hundred grams (100 g) of suspension-polymerization PVC ($\bar{p}=1800$), 110 g of calcium carbonate, 100 g of talc, 6 g of tribasic lead sulfate, 3 g of dibasic lead phosphite, and 1 g of lead stearate were mixed and stirred. The resultant mixture was extruded at 180° C. by means of a screw extruder having two screws meshing each other and rotating in the same direction.

Fifteen grams (15 g) of azodicarbonamide, 15 g of urea-type auxiliary foaming agent, 15 g of azobisisobutyronitrile, and 300 g of toluene were added to the kneaded mixture at room temperature. The additives and the kneaded mixture were also stirred and mixed at room temperature. The resultant mixture was extruded at room temperature at the compression ratio of 0; there was no flow resistance at the end of the extruder.

The extruded mixture was charged into a press mold having the same size as that used in Example 1. The mixture was heated under pressure first at 100° C. for 10 minutes, then at 120° C. for 10 minutes, and finally at 160° C. for 15 minutes. The press mold was cooled quickly, thereby forming a foamed body. The foamed body was removed from the mold. This foamed body shrank to the original size, and was no longer a foamed body.

As can be understood from this fact, no foamed bodies can be obtained if the organic solvent is added to the main components at room temperature, and mixed with them at room temperature.

COMPARATIVE EXAMPLE 2

One hundred grams (100 g) of mass-polymerization PVC ($\bar{p}=1300$), 100 g of calcium carbonate, 100 g of magnesium silicate, 6 g of tribasic lead sulfate, 3 g of dibasic lead phosphite, and 1 g of lead stearate were mixed by a blender for 10 minutes.

Fifteen grams (15 g) of dinitrosopentamethylenetetramine, 15 g of urea-type auxiliary foaming agent, 15 g of azobisisobutyronitrile, and 260 g of toluene were added to the kneaded mixture. The mixture was stirred and mixed. The resultant mixture was extruded at 65° C., at the compression ratio of 0; there was no flow resistance at the end of the extruder.

The extruded mixture was charged into a press mold having the same size as that used in Example 1. The mixture was heated under pressure first at 100° C. for 10 minutes, then at 120° C. for 10, and finally at 160° C. for 15 minutes. The press mold was cooled quickly, and its contents removed. No foamed bodies were produced.

This fact shows that no foamed bodies can be manufactured unless shearing force is applied to the mixture of the PVC and the inorganic powder.

COMPARATIVE EXAMPLE 3

One hundred grams (100 g) of mass-polymerization PVC ($\bar{p}=1000$), 120 g of calcium carbonate, 110 g of magnesium silicate, 5 g of tribasic lead sulfate, 3 g of dibasic lead phosphite, and 2 g of lead stearate were mixed. The resultant mixture was extruded at 160° C. by means of a screw extruder having two screws not meshing with each other.

Fourteen grams (14 g) of dinitrosopentamethylenetetramine, 14 g of urea-type auxiliary foaming agent, 10 g of azodicarbonamide, and 300 g of toluene were added to the kneaded mixture. The mixture was stirred and mixed. The resultant mixture was extruded at 65° C., at the compression ratio of 0; there was no flow resistance at the end of the extruder. The extruded mixture was heated in a press mold first at 120° C. for 10 minutes, and and then at 160° C. for 15 minutes, thereby forming a foamed body.

The foamed body was placed in an oven and heated at 110° C. It was found that the body shrank within ten minutes to the original size.

It can be understood from this fact, that foamed bodies cannot be obtained when the PVC used has a lower average degree of polymerization $\bar{p}$ such as 1000.

What is claimed is:

1. A process for preparing inorganic light weight foam, the process comprising the steps of:
    kneading a composition, whose main components are an inorganic powder and a vinyl chloride-based resin, at 140° C. to 200° C. while applying a shearing force on the composition;
    mixing an organic solvent having a solubility parameter ($\delta$) of 7 to 10 and a boiling point of 80° to 140° C., and a foaming agent with the kneaded composition at 40° to 80° the ratio by weight of the organic solvent to the total amount of the inorganic powder and the vinyl chloride-based resin ranging from 60:40 to 40:60, thereby forming a foamable composition wherein the organic solvent penetrates into the main components; and
    molding end foaming the foamable composition under pressure at 150 to 180° C.

2. A process for preparing inorganic light weight foam comprising: preparing a foamable composition by kneading a composition, whose main components are an inorganic powder and a vinyl chloride-based resin, the vinyl chloride-based resin being a higher molecular weight resin made by suspension-polymerization or mass-polymerization, and having an average degree of polymerization ($\bar{p}$) of 1300 to 10000 as defined by JIS K-6721-1959 and the ratio by weight of the inorganic powder to the vinyl chloride-based resin ranging from 50:50 to 85:15, at between 140? C. and 200? C. while applying a shearing force on the composition, mixing an organic solvent having a solubility parameter ($\delta$) of 7 to 10, and a boiling point of 80° C. to 140° C., and a foaming agent with the kneaded composition at 40° C. to 80° C., the ratio by weight of the organic solvent to the total amount of the inorganic powder and the vinyl chloride-based resin ranging from 60:40 to 40:60, thereby forming a foamable composition in which the organic solvent penetrates into the inorganic powder and the resin; and molding and foaming the foamable composition under pressure at between 150° and 180° C.

* * * * *